(12) United States Patent
Allemand et al.

(10) Patent No.: US 10,720,257 B2
(45) Date of Patent: Jul. 21, 2020

(54) METHODS TO INCORPORATE SILVER NANOWIRE-BASED TRANSPARENT CONDUCTORS IN ELECTRONIC DEVICES

(71) Applicant: CHAMP GREAT INT'L CORPORATION, Eden Island (SC)

(72) Inventors: Pierre-Marc Allemand, San Jose, CA (US); Paul Mansky, San Francisco, CA (US)

(73) Assignee: Cambrios Film Solutions Corporation, Tortola (VG)

( * ) Notice: Subject to any disclaimer, the term of this patent is extended or adjusted under 35 U.S.C. 154(b) by 46 days.

(21) Appl. No.: 13/840,864

(22) Filed: Mar. 15, 2013

(65) Prior Publication Data

US 2014/0234618 A1 Aug. 21, 2014

Related U.S. Application Data

(60) Provisional application No. 61/765,420, filed on Feb. 15, 2013.

(51) Int. Cl.
*H01B 7/00* (2006.01)
*H01B 1/02* (2006.01)
*G06F 3/045* (2006.01)

(52) U.S. Cl.
CPC ............... *H01B 1/02* (2013.01); *G06F 3/045* (2013.01); *G06F 2203/04112* (2013.01); *Y10T 428/2804* (2015.01)

(58) Field of Classification Search
CPC ........... B32B 7/12; B32B 15/02; B32B 15/08; B32B 17/10; B32B 17/10376; B32B 27/04; B32B 27/12; B32B 2307/202; B32B 2307/412; B32B 2307/752; B32B 2457/208; H01B 7/00; H01B 1/02
USPC .................................................. 977/762, 773
See application file for complete search history.

(56) References Cited

U.S. PATENT DOCUMENTS

| | | | |
|---|---|---|---|
| 2,453,087 A | 11/1948 | Dersch et al. | |
| 2,588,538 A | 3/1952 | Kendall et al. | |
| 2,839,405 A | 6/1958 | Jones | |
| 3,579,333 A | 5/1971 | Land et al. | |
| 3,630,744 A | 12/1971 | Brasschaat et al. | |
| 3,888,677 A | 6/1975 | Abele et al. | |
| 3,925,086 A | 12/1975 | Baldassarri et al. | |
| 4,666,827 A | 5/1987 | Sumi et al. | |
| 4,719,174 A | 1/1988 | Hirano et al. | |
| 4,908,273 A * | 3/1990 | Urech | B32B 27/38 156/330 |
| 5,667,953 A | 9/1997 | Bertoldi et al. | |

(Continued)

FOREIGN PATENT DOCUMENTS

EP  0 933 677 A1  8/1999
JP  2006272876 A  10/2006
(Continued)

OTHER PUBLICATIONS

Sun et al., "Crystalline Silver Nanowires by Soft Solution Processing," Nano Letters 2(2): 165-168, 2002.

(Continued)

*Primary Examiner* — Andrew T Piziali
(74) *Attorney, Agent, or Firm* — Cooper Legal Group, LLC (57) ABSTRACT

Disclosed herein are optical stacks that are stable to light exposure by incorporating light-stabilizers.

21 Claims, 6 Drawing Sheets

(56) References Cited

U.S. PATENT DOCUMENTS

| | | | |
|---|---|---|---|
| 6,975,067 B2 | 12/2005 | McCormick et al. | |
| 7,527,749 B2 * | 5/2009 | Li | C09J 9/00 252/500 |
| 8,049,333 B2 | 11/2011 | Alden et al. | |
| 2004/0063837 A1 | 4/2004 | Kubik et al. | |
| 2007/0074316 A1 | 3/2007 | Alden et al. | |
| 2008/0125539 A1 * | 5/2008 | Mack | C08G 18/10 524/588 |
| 2008/0143906 A1 | 6/2008 | Allemand et al. | |
| 2008/0210052 A1 | 9/2008 | Allemand | |
| 2009/0026607 A1 * | 1/2009 | Huebner | H01L 21/563 257/737 |
| 2009/0223703 A1 | 9/2009 | Winoto | |
| 2009/0283304 A1 | 11/2009 | Winoto | |
| 2011/0024159 A1 | 2/2011 | Allemand et al. | |
| 2011/0045272 A1 | 2/2011 | Allemand | |
| 2011/0048170 A1 | 3/2011 | Bhatia et al. | |
| 2011/0174190 A1 | 7/2011 | Sepa et al. | |
| 2011/0174334 A1 * | 7/2011 | Fan | B01D 11/023 134/6 |
| 2012/0104374 A1 | 5/2012 | Allemand | |
| 2018/0052281 A1 * | 2/2018 | Kuo | H04B 1/38 |

FOREIGN PATENT DOCUMENTS

| | | |
|---|---|---|
| JP | 2011-150316 A | 8/2011 |
| KR | 20080066658 A | 7/2008 |
| WO | 2007/022226 A2 | 2/2007 |
| WO | 2010/026571 A2 | 3/2010 |
| WO | 2010/104944 A2 | 9/2010 |
| WO | 2011/115603 A1 | 9/2011 |

OTHER PUBLICATIONS

Korean Office Action cited in Application No. 10-2015-7025061 dated Apr. 28, 2020, 17 pgs.

* cited by examiner

METHODS TO INCORPORATE SILVER NANOWIRE-BASED TRANSPARENT CONDUCTORS IN ELECTRONIC DEVICES

BACKGROUND

Technical Field

The disclosure relates to processing methods for making stable and reliable optical stacks comprising transparent conductive films of silver nanowires and optically clear adhesives (OCA).

Description of the Related Art

Transparent conductors refer to thin conductive films coated on high-transmittance surfaces or substrates. Transparent conductors may be manufactured to have surface conductivity while maintaining reasonable optical transparency. Such surface conducting transparent conductors are widely used as transparent electrodes in flat liquid crystal displays, touch panels, electroluminescent devices, and thin film photovoltaic cells; as anti-static layers; and as electromagnetic wave shielding layers.

Currently, vacuum deposited metal oxides, such as indium tin oxide (ITO), are the industry standard materials for providing optical transparency and electrical conductivity to dielectric surfaces such as glass and polymeric films. However, metal oxide films are fragile and prone to damage during bending or other physical stresses. They also require elevated deposition temperatures and/or high annealing temperatures to achieve high conductivity levels. For certain substrates that are prone to adsorbing moisture, such as plastic and organic substrates (e.g., polycarbonates), it becomes problematic for a metal oxide film to adhere properly. Applications of metal oxide films on flexible substrates are therefore severely limited. In addition, vacuum deposition is a costly process and requires specialized equipment. Moreover, the process of vacuum deposition is not conducive to forming patterns and circuits. This typically results in the need for expensive patterning processes such as photolithography.

In recent years there is a trend to replace current industry standard transparent conductive ITO films in flat panel displays with a composite material of metal nanostructures (e.g., silver nanowires) embedded in an insulating matrix. Typically, a transparent conductive film is formed by first coating on a substrate an ink composition including silver nanowires and a binder. The binder provides the insulating matrix. The resulting transparent conductive film has a sheet resistance comparable or superior to that of the ITO films.

Nanostructure-based coating technologies are particularly suited for printed electronics. Using a solution-based format, printed electronic technology makes it possible to produce robust electronics on large-area, flexible substrates. See U.S. Pat. No. 8,049,333, in the name of Cambrios Technologies Corporation, which is hereby incorporated by reference in its entirety. The solution-based format for forming nanostructure-based thin film is also compatible with existing coating and lamination techniques. Thus, additional thin films of overcoat, undercoat, adhesive layer, and/or protective layer can be integrated into a high through-put process for forming optical stacks that include nanostructure-based transparent conductors.

Although generally considered as a noble metal, silver can be sensitive to corrosion under specific circumstances. One result of silver corrosion is a loss of conductivity either locally or uniformly, which manifests as drifts in sheet resistance of the transparent conductive film, leading to an unreliable performance. Accordingly, there remains a need in the art to provide reliable and stable optical stacks incorporating nanostructure-based transparent conductor.

BRIEF SUMMARY

Disclosed are optical stacks including silver nanostructure-based transparent conductors or thin films that are stable to prolonged heat and light exposure.

One embodiment provides an optical stack comprising: a first substrate; a conductive layer of metal nanostructures on the first substrate; an optically clear adhesive (OCA) layer; wherein at least one of the conductive network layer or the OCA layer further comprises one or more photo-stabilizers.

In various embodiment, the metal nanostructures are interconnecting metal nanowires, more specifically, silver nanowires.

In a further embodiment, the metal nanostructures are in contact with the OCA layer.

In various embodiments, the photo-stabilizer is an alkene, a terpene (e.g.,) limonene or terpineol, a tetrazole, a triazole, a hindered phenol, a phosphin, a thioether, or a metallic photo-desensitizer.

In one embodiment, the photo-stabilizer is incorporated in the OCA layer.

In another embodiment, the photo-stabilizer is incorporated in the conductive network layer of silver nanostructures.

In a further embodiment, a drift in sheet resistance of the conductive layer is less than 10% after exposing the optical stack to accelerated light of at least 200 mW/cm2 measured at 365 nm for at least 200 hours.

In yet another embodiment, a drift in sheet resistance of the conductive layer is less than 30% after exposing the optical stack to light of at least 200 mW/cm2 measured at 365 nm for at least 800 hours.

In various embodiment as set forth above, the sheet resistance of the conductive layer is less than 500 Ω/sq. prior to exposing the optical stack to accelerated light.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been selected solely for ease of recognition in the drawings.

DETAILED DESCRIPTION

Transparent conductive films are essential components in flat panel display devices such as a touch screen or a liquid crystal display (LCD). The reliability of these devices is dictated in part by the stability of the transparent conductive films, which are exposed to light and heat under the devices' normal operating conditions. As discussed herein in more detail, it is discovered that prolonged light exposure may induce corrosion of silver nanostructures, causing localized or uniform increase in sheet resistance of the transparent conductor.

Thus, disclosed are optical stacks including silver nanostructure-based transparent conductors or thin films that are stable to prolonged heat and light exposure and methods for preparing the same.

As used herein, "optical stack" refers to a multi-layer structure or panel that is generally placed in a light path of an electronic device (e.g., a flat panel display). The optical stack includes at least one layer of a metal nanostructure-based transparent conductive film (or transparent conductor). Other layers of the optical stack may include, for example, a substrate, an overcoat, an undercoat, an adhesive layer, a protective layer (e.g., cover glass) or other performance-enhancing layers such as anti-reflective or anti-glare films. Preferably, the optical stack includes at least one layer of optically clear adhesive.

Figure 1:
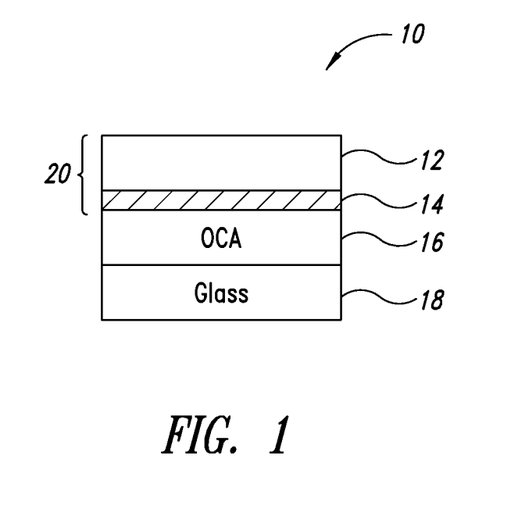
FIG. 1 shows an optical stack including a metal nanostructure-based transparent conductor.

FIG. 1 shows an optical stack (10) including a first substrate (12), a silver nanostructure-based transparent conductor (14), an OCA layer (16) and a second substrate (18). The optical stack (10) may be formed by first forming a basic transparent conductor (20) by depositing on the first substrate (12) a coating solution of silver nanostructures, a binder and a volatile solvent. After drying and/or curing, the silver nanostructures are immobilized on the first substrate (12). The first substrate (12) may be a flexible substrate (e.g., PET). An example of the basic transparent conductor (20) is commercially available under the trade name ClearOhm® by Cambrios Technologies Corporation, the assignee of the present application. The basic transparent conductor (20) may be laminated to the second substrate (18) via the OCA layer (16).

The propensity for corrosion of the silver nanostructures upon light exposure may be attributed to a complex set of factors. It is discovered that a close proximity to the OCA in some cases appears to induce and aggravate the corrosion of the silver nanostructures.

Optically clear adhesives (OCA) are thin adhesive films often used to assemble or bond several functional layers (e.g., cover glass and transparent conductors) into an optical stack or panel (FIG. 1). Such a panel can serve as, for example, a capacitive touch panel. An OCA often contains mixtures of alkyl acrylates formed by free radical polymerization. As a result, the OCA may contain unreacted initiators or photo-initiators, residual monomers, solvents, and free radicals. Some of these species are photo-sensitive and can be harmful to the silver nanostructures in close proximity to the OCA. As used herein, the OCA may be pre-made (including commercial forms) and laminated onto a substrate, or coated directly onto a substrate from a liquid form.

Photo-sensitive species readily absorb photos and undergo or induce complex photochemical activities. One type of photochemical activity involves excitation of a compound from a ground state to a higher energy level, i.e., an excited state. The excited state is transient and generally would decay back to the ground state with release of heat. Yet it is also possible for the transient excited state to cause complex, cascading reactions with other species.

Regardless of the mechanisms, it is discovered that certain photochemical activities cause corrosion of the silver nanostructures through an oxidation reaction:

In certain embodiments, the corrosions are inhibited by suppressing the photochemical activities of the excited state or facilitating a rapid return to the ground state.

Thus, various embodiments provide stable optical stacks in which one or more photo-stabilizers are combined with any of the layers. As used herein, a photo-stabilizer generally refers to a compound or additive that may act on any mechanism to suppress photochemical activities, particularly with respect to photo-induced oxidation of the silver nanostructures. For instance, the photo-stabilizer may act as a hole trap to scavenge holes generated from the photo-sensitive species that are most likely associated with the OCA layer. The photo-stabilizer may also act as a desensitizer which forestalls the hole creation. The photo-stabilizer may also act an anti-oxidant that undergoes a sacrificial oxidation reaction to destroy oxidants before they can interact with the silver nanostructures.

Photo-Stabilizer

The photo-stabilizer may be any one of the following classes of compounds. Generally speaking, they are non-volatile (having a boiling point of at least 150° C.) and may be a liquid or solid. They may be a small organic molecule with molecular weight of no more than 500, or may be an oligomer that has 2-100 monomers or a polymer of more than 100 monomers.

1. Alkenes

Alkenes are hydrocarbons that contain at least one carbon-carbon double bond. The double bond makes an alkene a candidate for sacrificial oxidation reaction. Alkenes may have a linear, cyclic or a combination of linear and cyclic carbon framework. On the carbon framework, alkene may be further substituted with hydroxy, alkoxy, thiol, halogen, phenyl, or amine groups.

In one embodiment, a suitable alkene has an alternate double bond and single bond arrangement to provide an extended conjugated structure. Such a conjugated structure allows for delocalization of radicals, thus stabilizing the same. Examples of conjugated alkenes include, without limitation, carotenes or carotenoids, certain terpenes or terpenoids.

In other embodiments, alkenes may have multiple, but un-conjugated double bonds. Examples of unconjugated alkenes include certain terpenes, rosins, polybutadiene, and the like.

In addition to being a photo-stabilizer, certain alkenes are also tackifiers and can be incorporated directly into an OCA.

i. Terpenes

Terpenes are a subset of alkenes. They are derived from resin produced by a variety of plants, particularly conifers. Although terpenes include a large diverse class of hydrocarbons, they all contain at least one isoprene unit. Terpenes may have cyclic as well as acyclic carbon framework. As used herein, terpenes also include terpenoids, which are derivatives of terpenes through oxidation or rearrangement of the carbon framework.

Due to their shared structures of isoprene, terpenes also have at least one carbon-carbon double bond, which may participate in a sacrificial oxidation reaction.

In certain embodiments, the photo-stabilizer is limonene. Limonene is a cyclic terpene containing two isoprene units. The ring double bond readily undergoes an oxidation reaction to form an epoxide:

Other suitable terpenes include humulene, squalene, farnesene, and the like. Suitable terpenoids include, without limitation, terpineol, genaniol and the like. Like limonene, these terpenes similarly undergo a sacrificial oxidation reaction.

ii. Resin Tackifiers

Resin tackifiers are alkenes derived from plant source or petroleum source. Resin tackifiers are excellent adhesives and may be incorporated directly into OCA, where they participate in sacrificial oxidation reactions to prevent the photo-sensitive species in the OCA from corroding the silver nanostructures.

Resin tackifiers may include rosins and polyterpenes, which are solid residues of plant-derived resin after the removal of the terpenes (which have lower boiling points). Suitable rosin or polyterpenes are commercially available from Pinova, Inc. (Brunswick, Ga.), or Eastman (Kingsport, Tenn.). Pertroleum-based resins may also be obtained from Eastman.

2. Hindered Phenols

Hindered phenols refer to phenol derivatives that have bulky substituents in the proximity of the hydroxyl group. The steric hindrance as well as the delocalization afforded by the phenyl group stabilize a hydroxyl radical, making hindered phenols suitable as a photo-stabilizer.

In one embodiment, the photo-stabilizer is a butylated hydroxy toluene (BHT). BHT (below) has two t-butyl groups adjacent to the hydroxyl group, making it a powerful anti-oxidant as the hydroxyl radical is stabilized by the adjacent t-butyl groups and the phenyl group.

Other suitable hindered phenols include, without limitation, butylated hydroxy anisole (BHA), alkyl gallate (e.g., methyl gallate, propyl gallate), tertiary-butylatedhydroquinone (TBHQ), vitamin E (alpha tocopherol), and the like.

3. Tetrazoles and Triazoles

Tetrazoles are organic compounds that contain a five-member ring of four nitrogens and one carbon. Triazoles are organic compounds that contain a five-member ring of three nitrogens and two carbons. Both tetrazoles and triazoles are photo-desensitizers. They also tend to bind to silver to form a protective coating that may further prevent corrosion.

In addition to the ring structures, as used herein, tetrazoles and triazoles may contain further substituents including thiol (SH), alkyl, phenyl, thio (=S), azo group and the like. They may be also further fused with other rings such as phenyl, pyridine or pyrimidine, etc.

In one embodiment, the photo-stabilizer is 1-phenyl-1H-tetrazole-5-thiol (PTZT). In another embodiment, the photo-stabilizer is benzotriazole (BTA)

In further various embodiments, a suitable photo-stabilizer may be any one of the photo-desensitizer compounds (including all the tetrazole and triazole compounds) disclosed in U.S. Pat. Nos. 2,453,087, 2,588,538, 3,579,333, 3,630,744, 3,888,677, 3,925,086, 4,666,827, 4,719,174, 5,667,953, and European Patent No. 0933677. All of these patents are incorporated herein by reference in their entireties.

4. Phosphines

Phosphines are organophosphorous compounds having three substituents attached to a phosphor (III). Phosphine undergoes oxidation reaction in which phosphor (III) is oxidized to phosphor (V). The substituents may the same or different and are typically aryl (e.g., substituted or unsubstituted phenyl) or alkyl (substituted or unsubstituted).

In one embodiment, the photo-stabilizer is triphenyl phosphine, which may be oxidized as follows:

5. Thioethers

Thioethers or sulfides are organosulfurous compounds having two substituents attached to sulfur group. The central sulfur group may be oxidized to a sulfoxide (S=O), which may be further oxidized to sulfone (S(=O)$_2$). The substituents may be the same or different and are typically aryl (e.g., substituted or unsubstituted phenyl) or alkyl (substituted or unsubstituted).

In one embodiment, the photo-stabilizer is thioether, which may be oxidized as follows:

6. Metallic Photo-Desensitizers

Certain metals may serve as inorganic photo-stabilizers as they can desensitize photochemical activities. Examples include rhodium salt (see U.S. Pat. No. 4,666,827) and zinc or cadmium salts (see U.S. Pat. No. 2,839,405). All of these patents are incorporated herein by reference in their entireties.

Incorporating the Photo-Stabilizer

The photo-stabilizer may be incorporated into any one of the layers of a given optical stack. In particular, because most of the functional layers of the optical stack may be formed by solution-based coating methods, the photo-stabilizer can be combined with the coating solution prior to coating. For instance, the photo-stabilizer may be incorporated into the nanostructure layer, an overcoat, an undercoat, the substrate, or an adhesive layer (e.g., OCA) through co-deposition.

While all of the layers, once incorporated with one or more photo-stabilizers, may contribute to stabilizing the silver nanostructures, the photo-stabilizers in the OCA layer can have a significant impact. Because the OCA layers are generally the thickest layers in an optical stack, they allow for a higher total content (e.g. in mg/m$^2$) of the photo-stabilizers. For example, the nanostructure layers considered herein typically have total thickness of 100-200 nm, whereas OCA layers have thicknesses ranging from 25 µm to 250 µm. Hence, even with a very low total concentration of a light stabilizing additive, a large total amount of the additive can be included in the OCA. This is especially beneficial if the additive is consumed while carrying out its protective function.

In certain embodiments, the photo-stabilizers, such as terpenes and certain resin tackifiers, are non-volatile liquid or semi-solid. Thus, the liquid photo-stabilizer can be combined directly with a pre-made OCA (e.g., in its commercial form). The pre-made OCA may be sprayed with, dipped in or otherwise contact the liquid photo-stabilizer. After a period of allowing the liquid to infiltrate, the residue liquid on the surface of the OCA layer can be wiped off or spun off. Examples of OCAs that may be used include those that are commercially available from 3M Company under product numbers 8146-2, 8142KCL, 8172CL, 8262N; Nitto Denko Corporation under the product number CS9662LS; and Hitachi Chemical Corporation under the product number TE7070. However, the above technique is not limited to commercial forms of OCA. Any adhesive layers may be similarly incorporated with one or more photo-stabilizers as described herein.

A transparent conductor (silver nanostructures conductive network formed on a substrate) may also be treated with a photo-stabilizer in the same manner as the OCA. For instance, the photo-stabilizer may contact (spray or dip) the transparent conductor for a period of time to allow for the diffusion of the photo-stabilizer into the transparent conductor.

The photo-stabilizers may also be first in the form of a dispersion that contains a volatile solvent (e.g., alcohols, acetone, water and the like). The dispersion is then combined with the coating solution prior to coating. Alternatively, the dispersion may be coated in a separate step independently from the other coating steps for forming the optical stack. The volatile solvent is thereafter removed along with other volatile solvent(s) in the coating solution. Thirdly, the dispersion may contact a layer (OCA or transparent conductor) for a period of time to allow for the diffusion of the photo-stabilizer into the layer.

Regardless of the form of the photo-stabilizer, it can also be combined directly with any film-forming coating solution prior to coating. For instance, the photo-stabilizer may be combined with a coating solution of the silver nanostructures, or a coating solution of overcoat or undercoat, or a coating solution for forming an adhesive layer.

Thus, one embodiment provides an optical stack comprising a substrate, a transparent conductor including a plurality of interconnecting silver nanostructures; an optically clear adhesive layer, wherein at least one of the transparent conductor and the optically clear adhesive layer incorporates one or more photo-stabilizers. In various embodiments, the photo-stabilizer may be an alkene (e.g., a terpene), a hindered phenol, a tetrazole or triazole, a phosphine, a thioether or metals as described herein.

Typically, the photo-stabilizer is present in a given layer (e.g., OCA) at a concentration (by weight) of at least 0.02%, or at least 0.05%, or at least 0.1%, or at least 2%, or at least 5%, or at least 10%.

Testing Photo-Stability

To test the photo-stability of the optical stack, sheet resistance of the optical stack under light exposure is measured as a function of time to detect any drift. Because the normal service or operating life of a display device can be years, an "accelerated light condition" may be designed to simulate the total light exposure within a normal operating life in a compressed time frame. Thus, "accelerated light condition" refers to an artificial or testing condition that exposes the optical stack to continuous and intense simulated light. Often, the accelerated light condition can be controlled to simulate the amount of light exposure that the optical stack is subjected to during a normal service life of a given device. Under the accelerated light condition, the light intensity is typically significantly elevated compared to the operating light intensity of the given device; the duration of the light exposure for testing the reliability of the conductive films can therefore be significantly compressed compared to the normal service life of the same device. Typically, light intensity is measured in Lumens, which is a unit of luminous flux. Under an accelerated light condition, the light is about 30 to 100 times more intense than the light condition of a device.

Figure 2:
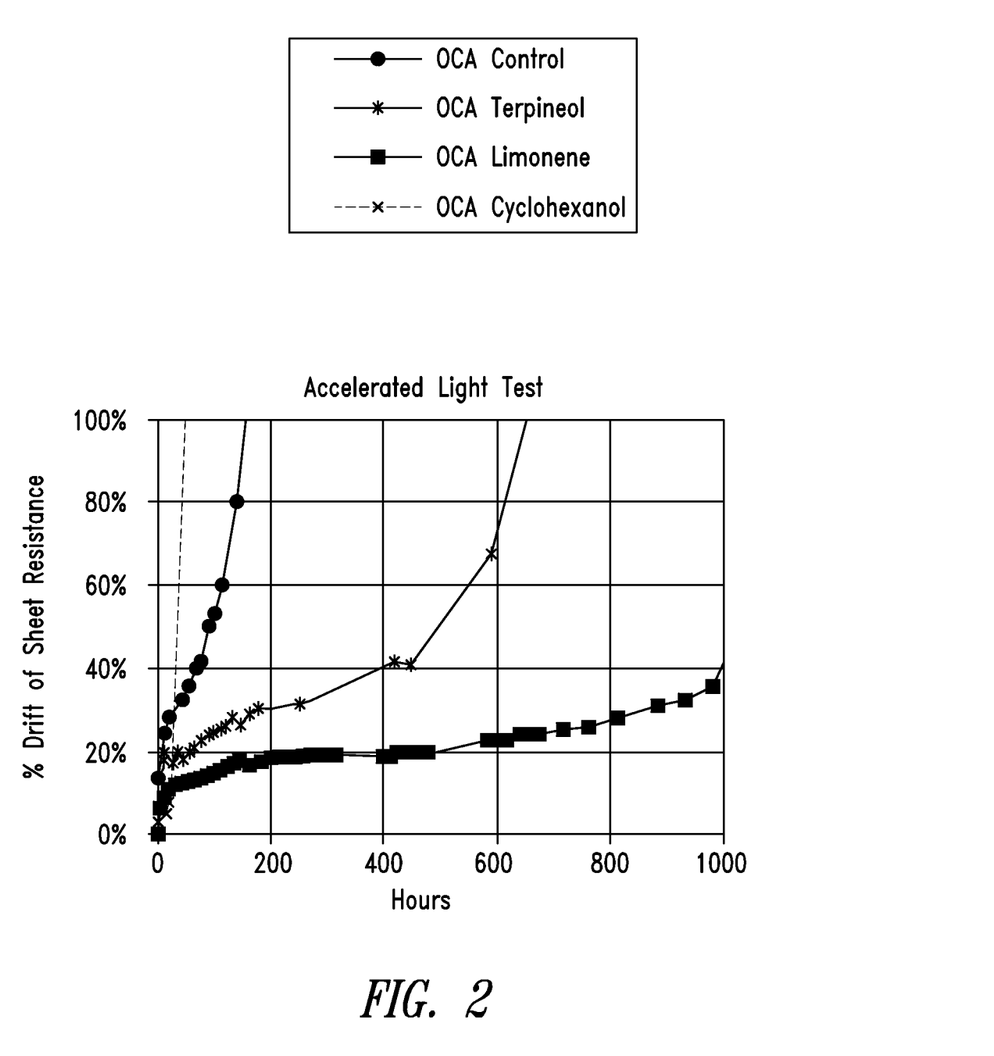
FIG. 2 shows the impacts of various photo-stabilizers on the % drift of sheet resistance of various optical stacks under an accelerated light condition.

FIG. 2 shows accelerated light tests of the various optical stacks with or without any additives in the OCA layer. Some of the additives acted as photo-stabilizers (terpineol and limonene), as evidenced by the significantly lower drifts in sheet resistance over time as compared to the control (optical stack with no additive in the OCA layer). The other additive (cyclohexanol) in fact accelerated the sheet resistance drift.

Thus, the accelerated light tests can be used to evaluate the effectiveness of a photo-stabilizer.

Certain other features of the present disclosure are further discussed in more detail below.

Metal Nanostructures

As used herein, "metal nanostructures" generally refer to electrically conductive nano-sized structures, at least one dimension of which (i.e., width or diameter) is less than 500 nm; more typically, less than 100 nm or 50 nm. In various embodiments, the width or diameter of the nanostructures are in the range of 10 to 40 nm, 20 to 40 nm, 5 to 20 nm, 10 to 30 nm, 40 to 60 nm, 50 to 70 nm.

The nanostructures can be of any shape or geometry. One way for defining the geometry of a given nanostructure is by its "aspect ratio," which refers to the ratio of the length and the width (or diameter) of the nanostructure. In certain embodiments, the nanostructures are isotropically shaped (i.e., aspect ratio=1). Typical isotropic or substantially isotropic nanostructures include nanoparticles. In preferred embodiments, the nanostructures are anisotropically shaped (i.e. aspect ratio≠1). The anisotropic nanostructure typically has a longitudinal axis along its length. Exemplary anisotropic nanostructures include nanowires (solid nanostructures having aspect ratio of at least 10, and more typically, at least 50), nanorod (solid nanostructures having aspect ratio of less than 10) and nanotubes (hollow nanostructures).

Lengthwise, anisotropic nanostructures (e.g., nanowires) are more than 500 nm, or more than 1 µm, or more than 10 µm in length. In various embodiments, the lengths of the nanostructures are in the range of 5 to 30 µm, or in the range of 15 to 50 µm, 25 to 75 µm, 30 to 60 µm, 40 to 80 µm, or 50 to 100 µm.

Metal nanostructures are typically a metallic material, including elemental metal (e.g., transition metals) or a metal compound (e.g., metal oxide). The metallic material can also be a bimetallic material or a metal alloy, which comprises two or more types of metal. Suitable metals include, but are not limited to, silver, gold, copper, nickel, gold-plated silver, platinum and palladium. It should be noted that although the present disclosure describes primarily nanowires (e.g., silver nanowires), any nanostructures within the above definition can be equally employed.

Typically, metal nanostructures are metal nanowires that have aspect ratios in the range of 10 to 100,000. Larger aspect ratios can be favored for obtaining a transparent conductor layer since they may enable more efficient conductive networks to be formed while permitting lower overall density of wires for a high transparency. In other words, when conductive nanowires with high aspect ratios are used, the density of the nanowires that achieves a conductive network can be low enough that the conductive network is substantially transparent.

Metal nanowires can be prepared by known methods in the art. In particular, silver nanowires can be synthesized through solution-phase reduction of a silver salt (e.g., silver nitrate) in the presence of a polyol (e.g., ethylene glycol) and poly(vinyl pyrrolidone). Large-scale production of silver nanowires of uniform size can be prepared and purified according to the methods described in U.S. Published Application Nos. 2008/0210052, 2011/0024159, 2011/0045272, and 2011/0048170, all in the name of Cambrios Technologies Corporation, the assignee of the present disclosure.

Conductive Network

A conductive network refers to a layer of interconnecting metal nanostructures (e.g., nanowire) that provide the electrically conductive media of a transparent conductor. Since electrical conductivity is achieved by electrical charge percolating from one metal nanostructure to another, sufficient metal nanowires must be present in the conductive network to reach an electrical percolation threshold and become conductive. The surface conductivity of the conductive network is inversely proportional to its surface resistivity, sometimes referred to as sheet resistance, which can be measured by known methods in the art. As used herein, "electrically conductive" or simply "conductive" corresponds to a surface resistivity of no more than $10^4$ $\Omega/\square$, or more typically, no more than 1,000 $\Omega/\square$, or more typically no more than 500 $\Omega/\square$, or more typically no more than 200 $\Omega/\square$. The surface resistivity depends on factors such as the aspect ratio, the degree of alignment, degree of agglomeration and the resistivity of the interconnecting metal nanostructures.

In certain embodiments, the metal nanostructures may form a conductive network on a substrate without a binder. In other embodiments, a binder may be present that facilitates adhesion of the nanostructures to the substrate. Suitable binders include optically clear polymers including, without limitation: polyacrylics such as polymethacrylates (e.g., poly(methyl methacrylate)), polyacrylates and polyacrylonitriles, polyvinyl alcohols, polyesters (e.g., polyethylene terephthalate (PET), polyester naphthalate, and polycarbonates), polymers with a high degree of aromaticity such as phenolics or cresol-formaldehyde (Novolacs®), polystyrenes, polyvinyltoluene, polyvinylxylene, polyimides, polyamides, polyamideimides, polyetherimides, polysulfides, polysulfones, polyphenylenes, and polyphenyl ethers, polyurethane (PU), epoxy, polyolefins (e.g. polypropylene, polymethylpentene, and cyclic olefins), acrylonitrile-butadiene-styrene copolymer (ABS), cellulosics, silicones and other silicon-containing polymers (e.g. polysilsesquioxanes and polysilanes), polyvinylchloride (PVC), polyacetates, polynorbornenes, synthetic rubbers (e.g., EPR, SBR, EPDM), and fluoropolymers (e.g., polyvinylidene fluoride, polytetrafluoroethylene (TFE) or polyhexafluoropropylene), copolymers of fluoro-olefin and hydrocarbon olefin (e.g., Lumiflon®), and amorphous fluorocarbon polymers or copolymers (e.g., CYTOP® by Asahi Glass Co., or Teflon® AF by Du Pont).

"Substrate" refers to a non-conductive material onto which the metal nanostructure is coated or laminated. The substrate can be rigid or flexible. The substrate can be clear or opaque. Suitable rigid substrates include, for example, glass, polycarbonates, acrylics, and the like. Suitable flexible substrates include, but are not limited to: polyesters (e.g., polyethylene terephthalate (PET), polyester naphthalate, and polycarbonate), polyolefins (e.g., linear, branched, and cyclic polyolefins), polyvinyls (e.g., polyvinyl chloride, polyvinylidene chloride, polyvinyl acetals, polystyrene, polyacrylates, and the like), cellulose ester bases (e.g., cellulose triacetate, cellulose acetate), polysulphones such as polyethersulphone, polyimides, silicones and other conventional polymeric films. Additional examples of suitable substrates can be found in, e.g., U.S. Pat. No. 6,975,067.

Typically, the optical transparence or clarity of the transparent conductor (i.e., a conductive network on a non-conductive substrate) can be quantitatively defined by parameters including light transmission and haze. "Light transmission" (or "light transmissivity") refers to the percentage of an incident light transmitted through a medium. In various embodiments, the light transmission of the conductive layer is at least 80% and can be as high as 98%. Performance-enhancing layers, such as an adhesive layer, anti-reflective layer, or anti-glare layer, may further contribute to reducing the overall light transmission of the transparent conductor. In various embodiments, the light transmission (T%) of the transparent conductors can be at least 50%, at least 60%, at least 70%, or at least 80% and may be as high as at least 91% to 92%, or at least 95%.

Haze (H %) is a measure of light scattering. It refers to the percentage of the quantity of light separated from the incident light and scattered during transmission. Unlike light transmission, which is largely a property of the medium, haze is often a production concern and is typically caused by surface roughness and embedded particles or compositional heterogeneities in the medium. Typically, haze of a conductive film can be significantly impacted by the diameters of the nanostructures. Nanostructures of larger diameters (e.g., thicker nanowires) are typically associated with a higher haze. In various embodiments, the haze of the transparent conductor is no more than 10%, no more than 8%, or no more than 5% and may be as low as no more than 2%, no more than 1%, or no more than 0.5%, or no more than 0.25%.

Coating Composition

The patterned transparent conductors according to the present disclosure are prepared by coating a nanostructure-containing coating composition on a non-conductive substrate. To form a coating composition, the metal nanowires are typically dispersed in a volatile liquid to facilitate the coating process. It is understood that, as used herein, any non-corrosive volatile liquid in which the metal nanowires can form a stable dispersion can be used. Preferably, the metal nanowires are dispersed in water, an alcohol, a ketone, ethers, hydrocarbons or an aromatic solvent (benzene, toluene, xylene, etc.). More preferably, the liquid is volatile, having a boiling point of no more than 200° C., no more than 150° C., or no more than 100° C.

In addition, the metal nanowire dispersion may contain additives and binders to control viscosity, corrosion, adhesion, and nanowire dispersion. Examples of suitable additives and binders include, but are not limited to, carboxy methyl cellulose (CMC), 2-hydroxy ethyl cellulose (HEC), hydroxy propyl methyl cellulose (HPMC), methyl cellulose (MC), poly vinyl alcohol (PVA), tripropylene glycol (TPG), and xanthan gum (XG), and surfactants such as ethoxylates, alkoxylates, ethylene oxide and propylene oxide and their copolymers, sulfonates, sulfates, disulfonate salts, sulfosuccinates, phosphate esters, and fluorosurfactants (e.g., Zonyl® by DuPont).

In one example, a nanowire dispersion, or "ink" includes, by weight, from 0.0025% to 0.1% surfactant (e.g., a preferred range is from 0.0025% to 0.05% for Zonyl® FSO-100), from 0.02% to 4% viscosity modifier (e.g., a preferred range is 0.02% to 0.5% for HPMC), from 94.5% to 99.0% solvent and from 0.05% to 1.4% metal nanowires. Representative examples of suitable surfactants include Zonyl® FSN, Zonyl® FSO, Zonyl® FSH, Triton (x100, x114, x45), Dynol (604, 607), n-Dodecyl b-D-maltoside and Novek. Examples of suitable viscosity modifiers include hydroxypropyl methyl cellulose (HPMC), methyl cellulose, xanthan gum, polyvinyl alcohol, carboxy methyl cellulose, and hydroxy ethyl cellulose. Examples of suitable solvents include water and isopropanol.

The nanowire concentration in the dispersion can affect or determine parameters such as thickness, conductivity (including surface conductivity), optical transparency, and mechanical properties of the nanowire network layer. The percentage of the solvent can be adjusted to provide a desired concentration of the nanowires in the dispersion. In preferred embodiments the relative ratios of the other ingredients, however, can remain the same. In particular, the ratio of the surfactant to the viscosity modifier is preferably in the range of about 80 to about 0.01; the ratio of the viscosity modifier to the metal nanowires is preferably in the range of about 5 to about 0.000625; and the ratio of the metal nanowires to the surfactant is preferably in the range of about 560 to about 5. The ratios of components of the dispersion may be modified depending on the substrate and the method of application used. The preferred viscosity range for the nanowire dispersion is between about 1 and 100 cP.

Following the coating, the volatile liquid is removed by evaporation. The evaporation can be accelerated by heating (e.g., baking). The resulting nanowire network layer may require post-treatment to render it electrically conductive. This post-treatment can be a process step involving exposure to heat, plasma, corona discharge, UV-ozone, or pressure as described below.

Examples of suitable coating compositions are described in U.S. Published Application Nos. 2007/0074316, 2009/0283304, 2009/0223703, and 2012/0104374, all in the name of Cambrios Technologies Corporation, the assignee of the present disclosure.

The coating composition is coated on a substrate by, for example, sheet coating, web-coating, printing, and lamination, to provide a transparent conductor. Additional information for fabricating transparent conductors from conductive nanostructures is disclosed in, for example, U.S. Published Patent Application No. 2008/0143906, and 2007/0074316, in the name of Cambrios Technologies Corporation.

The transparent conductor structures, their electrical and optical properties, and the methods of patterning are illustrated in more detail by the following non-limiting examples.

EXAMPLES

Example 1

Synthesis of Silver Nanowires

Silver nanowires were synthesized by the reduction of silver nitrate dissolved in ethylene glycol in the presence of poly(vinyl pyrrolidone) (PVP) following the "polyol" method described in, e.g., Y. Sun, B. Gates, B. Mayers, & Y. Xia, "Crystalline silver nanowires by soft solution processing", *Nanoletters,* (2002), 2(2) 165-168. A modified polyol method, described in U.S. Published Application Nos. 2008/0210052 and 2011/0174190, in the name of Cambrios Technologies Corporation, produces more uniform silver nanowires at higher yields than does the conventional "polyol" method. These applications are incorporated by reference herein in its entirety.

Example 2

Control Stack

A control stack was made by (1) preparing a transparent conductor of silver nanostructure conductive network deposited on a PET film (e.g., ClearOhm®); (2) laminating an OCA on glass, and (3) laminating the transparent conductor on the OCA/glass, the silver nanostructures being in contact with the OCA.

The optical stack was exposed to an accelerated light test with the PET film facing the light source. The lighting condition was 200 mW/cm$^2$ measured at 365 nm. The sheet resistance was measured as a function of time with a non-contact method with a Delcom resistance measurement instrument. The resistivity drifts were shown in Table 1. As shown, the sheet resistance steadily drifts upwards, and the optical stack became essentially non-conductive after 181 hours.

TABLE 1

| OCA control | |
|---|---|
| % R drift at 26 hrs | 23% |
| % R drift at 72 hrs | 35% |
| % R drift at 121 hrs | 67% |
| % R drift at 181 hrs | Open |

Example 3

UV Exposure

An optical stack was prepared in the same manner as in Example 1. It was then exposed to UV radiation using a Fusion system equipped with an H-bulb, for 3 passes at 3 ft/min on one side of the stack, then 3 passes at 3 ft/min on the other side.

This stack was thereafter exposed to an accelerated light test (200 mW/cm$^2$ measured at 365 nm) and the sheet resistance was measured as a function of time with a non-contact method. As shown in Table 2, compared to the control of Example 2, the initial (first 100 hrs) resistance drift was greatly suppressed when the stack was first exposed to UV radiation.

TABLE 2

| OCA UV exposure | |
|---|---|
| % R drift at 22 hrs | 0% |
| % R drift at 70 hrs | 6% |
| % R drift at 113 hrs | 19% |
| % R drift at 181 hrs | 66% |

Example 4

OCA Treated with Photo-Stabilizers

An optical stack was prepared by first laminating an OCA layer on a glass substrate, exposing the OCA to a puddle of terpineol then spinning excess off, followed by baking at 80° C. for 60 seconds in an oven.

Thereafter, a transparent conductor of silver nanostructures on PET substrate was laminated on the OCA, the silver nanostructures being in contact with the OCA treated with terpineol. The stack was exposed to an accelerated light test (200 mW/cm$^2$ measured at 365 nm) and the sheet resistance was measured as a function of time with a non-contact method. It was found that, as shown in Table 3, the long term (up to 449 hrs) resistance drift was greatly suppressed when the OCA was treated with terpineol.

TABLE 3

| OCA treated with terpineol | |
|---|---|
| % R drift at 26 hrs | 18% |
| % R drift at 72 hrs | 22% |
| % R drift at 12 hrs | 25% |
| % R drift at 181 hrs | 30% |
| % R drift at 449 hrs | 41% |

In making another optical stack, the OCA layer was first treated with limonene a similar manner as terpineol. The liquid limonene was allowed to puddle on the OCA layer for about 60 seconds. Limonene was then spun off and dried in a nitrogen atmosphere. Thereafter, the OCA/glass was laminated on a silver nanostructure-based transparent conductor, the OCA layer being in contact with the silver nanostructure. The starting resistance of the transparent conductor was less than 500 Ω/sq. The film stack was then exposed to an accelerated light test (200 mW/cm$^2$ measured at 365 nm).

This procedure was repeated for cyclohexanol.

As shown in FIG. 2, the film stack exposed to limonene had a resistance drift (as measured using a non-contact method) below 30% out to 800 hours and below 40% out to almost 1000 hours, indicating that limonene is an effective photo-stabilizer that is capable of forestalling silver corrosion upon light exposure.

Example 5

Incorporating Photo-Stabilizer into Transparent Conductor

Figure 3:
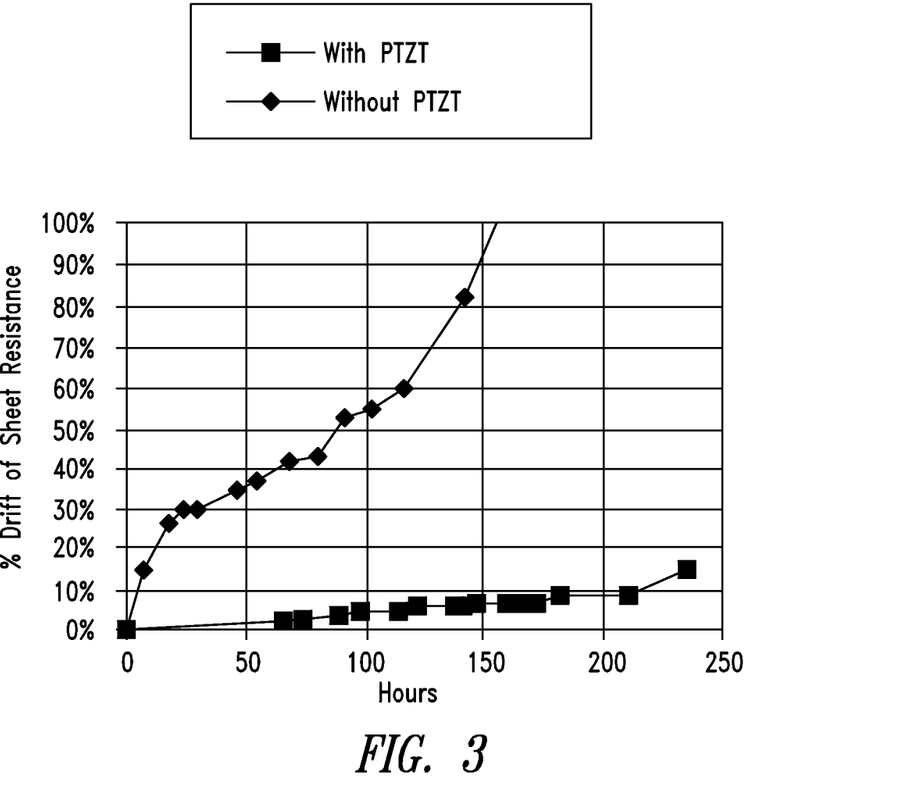
FIGS. 3-6 show the percentage drifts of sheet resistance of various optical stacks treated with various photo-stabilizers according to several embodiments.

A transparent conductor of silver nanostructures was first formed on PET ("NW film on PET"). A 1% dispersion of 1-phenyl-1H-tetrazole-5-thiol (PTZT) in methanol was prepared. The NW film on PET was then soaked in the PTZT solution before drying with nitrogen and wiping off the excess. The treated transparent conductor was then laminated to a glass substrate using an OCA The starting resistance of the transparent conductor was less than 500 Ω/sq. The accelerated light test (200 mW/cm$^2$ measured at 365 nm) is shown in FIG. 3. As shown, the transparent conductor treated with PTZT shows less than 10% drift after 200 hours, whereas the untreated transparent conductor became non-conductive after 150 hours. The result indicates that PTZT was effective in preventing photo corrosion of the silver nanostructures.

Figure 4:
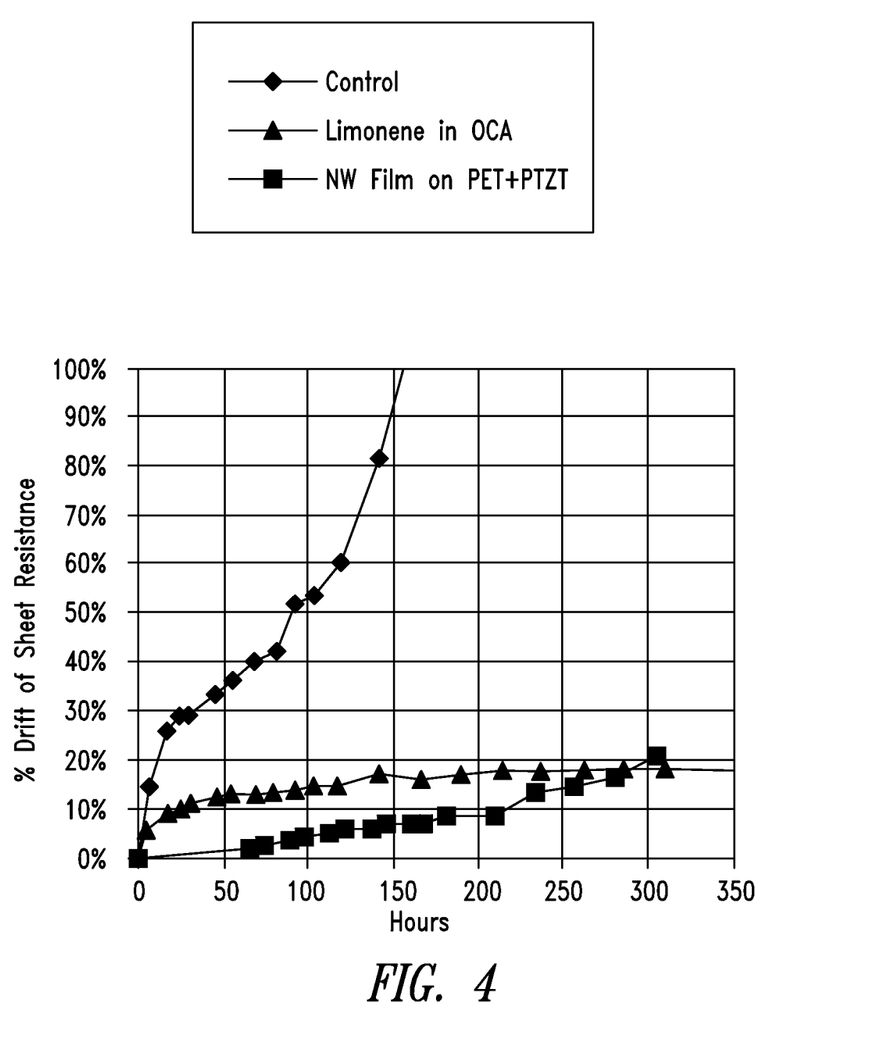

FIG. 4 shows the accelerated light tests of PTZT-treated NW film and limonene-treated OCA film as compared to the untreated optical stack. As shown, both photo-stabilizers were comparably effective in reducing or preventing photo corrosion.

Figure 5:
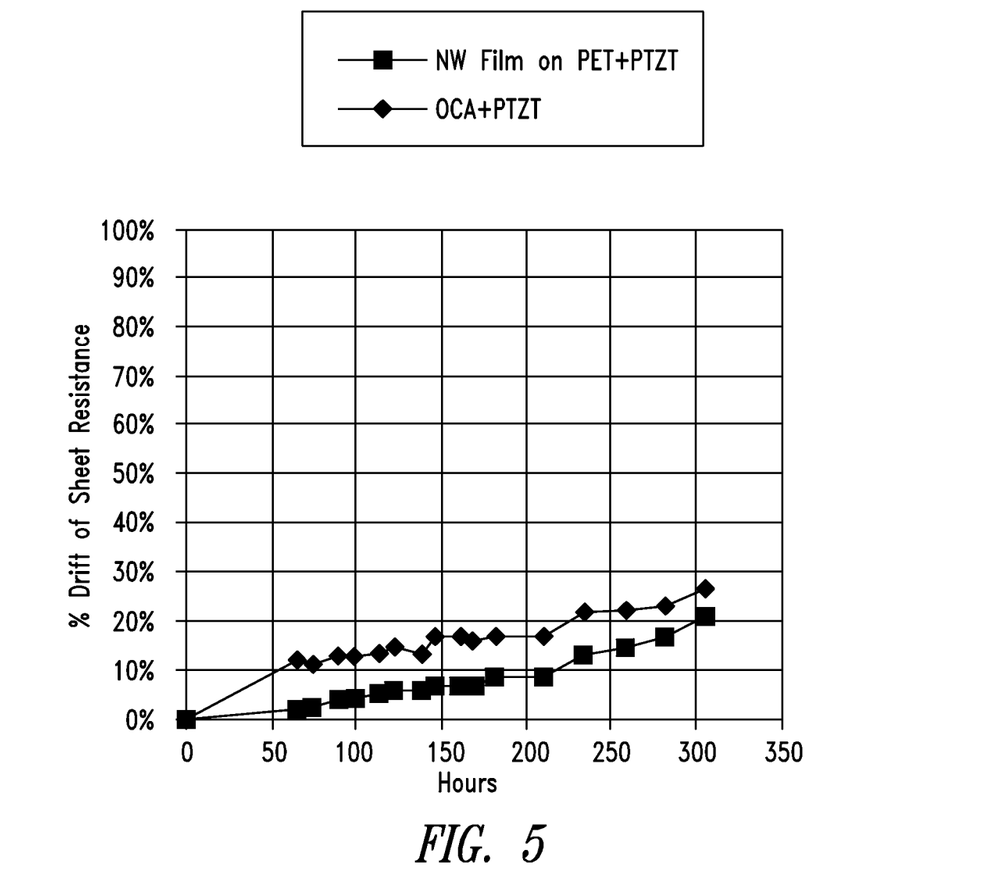

FIG. 5 shows the accelerated light tests of PTZT-treated NW film and PTZT-treated OCA film. As shown, PTZT was comparably effective at different locations of an optical stack (e.g., the NW film or OCA film).

Example 6

Incorporating Photo-Stabilizer into Transparent Conductor

Figure 6:
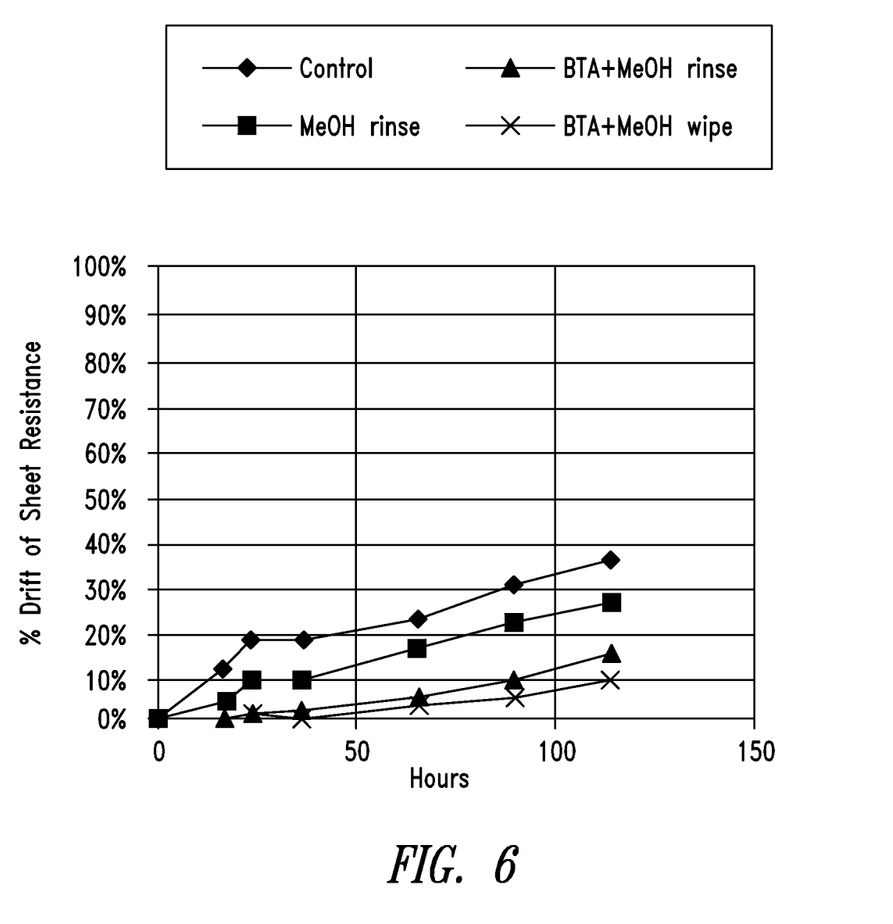

Another transparent conductor was treated with benzothiazole (BTA) in a similar manner as described above. A control, untreated transparent conductor was also prepared, as was a control, methanol-treated transparent conductor. FIG. 6 shows that the BTA-treated transparent conductors are more stable than transparent conductors untreated by BTA under the accelerated light condition.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention.

The invention claimed is:

1. An optical stack, comprising:
   a first substrate;
   a transparent conductor layer disposed over the first substrate, wherein the transparent conductor layer comprises a conductive network of silver nanostructures and a binder in which the silver nanostructures are disposed; and
   an optically clear adhesive (OCA) layer disposed over the transparent conductor layer, wherein:
   an interface is defined where the OCA layer abuts the transparent conductor layer,
   the binder comprises a polymer,
   the polymer is only present at and below the interface,
   the silver nanostructures are entirely disposed below the interface,
   the OCA layer comprises a photo-sensitive species,
   the OCA layer comprises one or more photo-stabilizers,
   a total weight of the one or more photo-stabilizers in the OCA layer is at least 10% of a total weight of the OCA layer, and
   the one or more photo-stabilizers suppress an oxidation of the silver nanostructures induced by the photo-sensitive species.

2. The optical stack of claim 1, wherein the silver nanostructures are interconnecting silver nanowires.

3. The optical stack of claim 1, wherein a first photo-stabilizer of the one or more photo-stabilizers comprises an alkene.

4. The optical stack of claim 1, wherein a first photo-stabilizer of the one or more photo-stabilizers comprises squalene.

5. The optical stack of claim 1, wherein a first photo-stabilizer of the one or more photo-stabilizers comprises farnesene.

6. The optical stack of claim 1, wherein a first photo-stabilizer of the one or more photo-stabilizers is a tetrazole.

7. The optical stack of claim 1, wherein a first photo-stabilizer of the one or more photo-stabilizers is a triazole.

8. The optical stack of claim 1, wherein a first photo-stabilizer of the one or more photo-stabilizers is a hindered phenol.

9. The optical stack of claim 1, wherein a first photo-stabilizer of the one or more photo-stabilizers is butylated hydroxy toluene, alkyl gallate, tertiary- butylatedhydroquinone, vitamin E, or butylated hydroxy anisole.

10. The optical stack of claim 1, wherein a first photo-stabilizer of the one or more photo-stabilizers is a phosphine.

11. The optical stack of claim 1, wherein a first photo-stabilizer of the one or more photo-stabilizers is a thioether.

12. The optical stack of claim 1, wherein a first photo-stabilizer of the one or more photo-stabilizers is a metallic photo-desensitizer selected from a cadmium salt, a zinc salt, or a rhodium salt.

13. The optical stack of claim 1, wherein the transparent conductor layer comprises one or more photo-stabilizers.

14. The optical stack of claim 1, wherein a first photo-stabilizer of the one or more photo-stabilizers comprises humulene.

15. The optical stack of claim 1, wherein a first photo-stabilizer of the one or more photo-stabilizers comprises genaniol.

16. The optical stack of claim 1, wherein the OCA layer has an adhesive surface that contacts a surface of the transparent conductor layer at the interface.

17. The optical stack of claim 1, wherein none of the one or more photo-stabilizers are present in the transparent conductor layer.

18. The optical stack of claim 1, wherein:
the OCA layer has an uppermost surface and a bottommost surface,
the interface is defined where the bottommost surface of the OCA layer abuts the transparent conductor layer, and
the OCA layer has a homogenous composition extending from the uppermost surface of the OCA layer to the bottommost surface of the OCA layer and different than a composition of the binder.

19. An optical stack, comprising:
a first substrate;
a transparent conductor layer disposed over the first substrate, wherein the transparent conductor layer comprises a conductive network of silver nanostructures and a binder in which the silver nanostructures are disposed, wherein the binder has a first composition;
an optically clear adhesive (OCA) layer disposed over the transparent conductor layer, wherein:
the OCA layer has an uppermost surface and a bottommost surface,
an interface is defined where the bottommost surface of the OCA layer abuts the transparent conductor layer,
the silver nanostructures are entirely disposed below the interface,
the OCA layer has a homogenous composition extending from the uppermost surface of the OCA layer to the bottommost surface of the OCA layer and different than the first composition,
the OCA layer comprises a photo-sensitive species,
the OCA layer comprises one or more photo-stabilizers, and
the one or more photo-stabilizers suppress an oxidation of the silver nanostructures induced by the photo-sensitive species; and
a second substrate disposed over the OCA layer.

20. The optical stack of claim 19, wherein the second substrate is in contact with the OCA layer.

21. The optical stack of claim 19, wherein:
the binder comprises a polymer, and
the binder is only present at and below the interface.

* * * * *